L. IRSZA.
SIGNAL HEADLIGHT FOR VEHICLES.
APPLICATION FILED MAR. 18, 1914.

1,147,945.

Patented July 27, 1915.
2 SHEETS—SHEET 1.

Witnesses

Inventor
Louis Irsza
By A. M. Wilson
Attorney

L. IRSZA.
SIGNAL HEADLIGHT FOR VEHICLES.
APPLICATION FILED MAR. 18, 1914.
1,147,945.
Patented July 27, 1915.
2 SHEETS—SHEET 2.
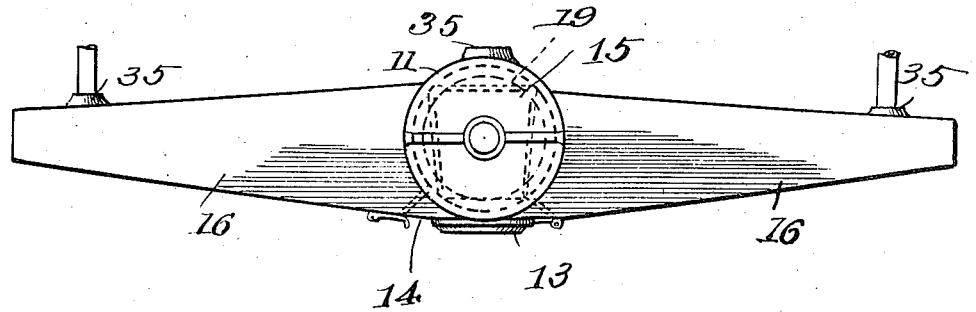
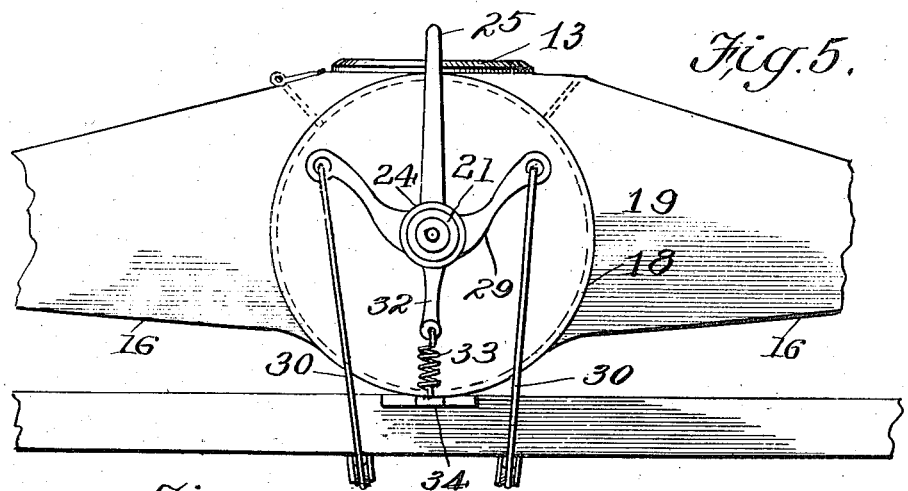
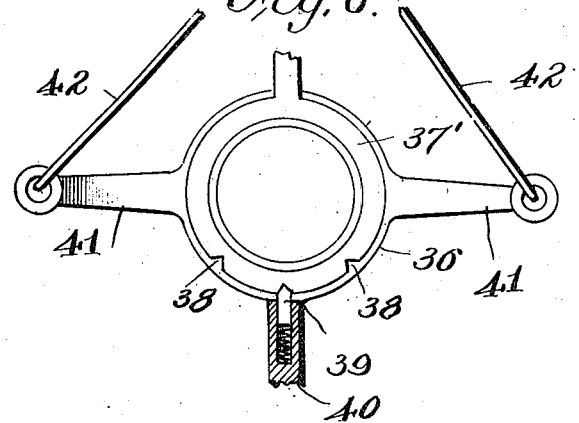
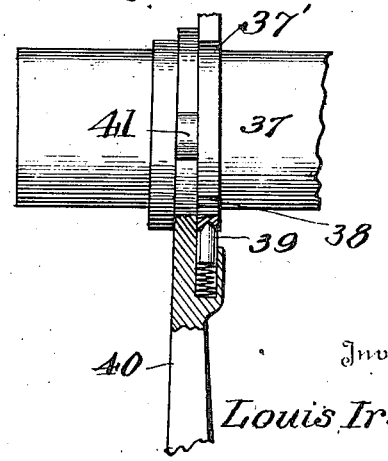
Witnesses
G. A. Pauberschmidt
H. B. Halász
Inventor
Louis Irsza
By A. M. Wilson
Attorney

UNITED STATES PATENT OFFICE.

LOUIS IRSZA, OF WEST PULLMAN, ILLINOIS.

SIGNAL-HEADLIGHT FOR VEHICLES.

1,147,945.  Specification of Letters Patent.  Patented July 27, 1915.

Application filed March 18, 1914. Serial No. 825,523.

*To all whom it may concern:*

Be it known that I, LOUIS IRSZA, a subject of the King of Hungary, residing at West Pullman, in the county of Cook and State of Illinois, have invented certain new and useful Improvements in Signal-Headlights for Vehicles, of which the following is a specification.

This invention relates to certain new and useful improvements in signal head-lights for vehicles, and is especially adapted for automobile use.

The primary object of the invention is to provide a headlight adapted for shifting from the operator's seat in such a manner as to light up an illuminated sign upon the desired side of the main light or burner for denoting the intended direction of travel to be taken by the vehicle.

A further object is to provide a signal headlight normally throwing its light forwardly but shiftable for illuminating arrow-shaped signal glasses upon the desired side of the main lamp for indicating the future course of travel of the vehicle.

A still further object is to provide oppositely pointing transparent signal signs and a revoluble headlight therebetween adapted for projecting light either forwardly or to the desired side of the vehicle.

With these general objects in view and others that will appear as the nature of the invention is better understood, the same consists in the novel combination and arrangement of parts hereinafter fully described, illustrated in the accompanying drawings, and pointed out in the appended claims.

Figure 1:
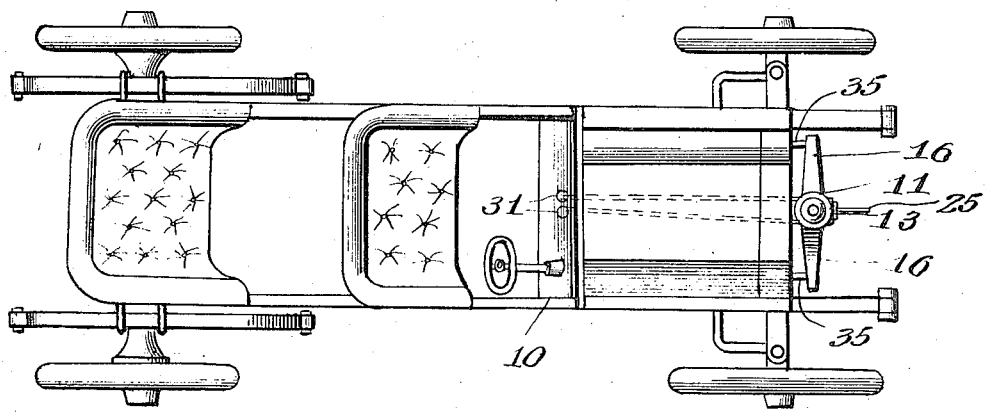
Figure 2:
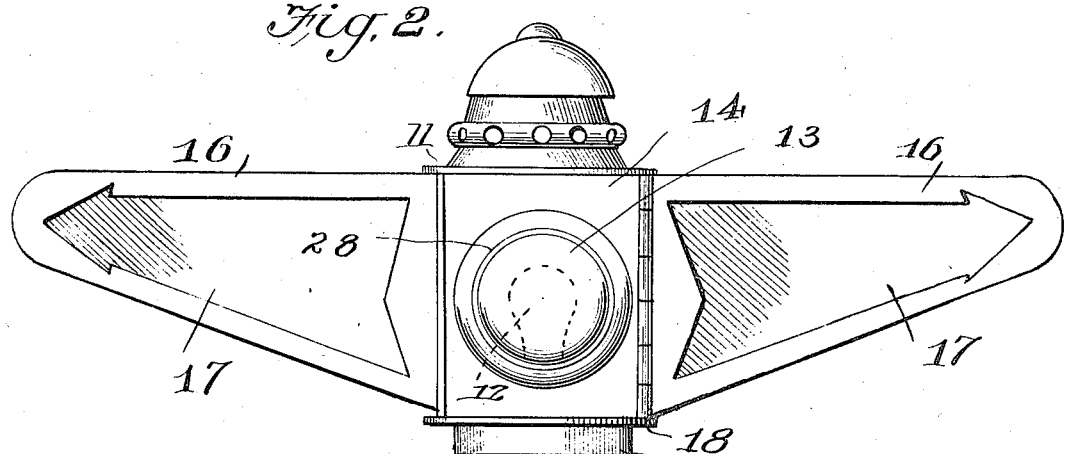
Figure 3:
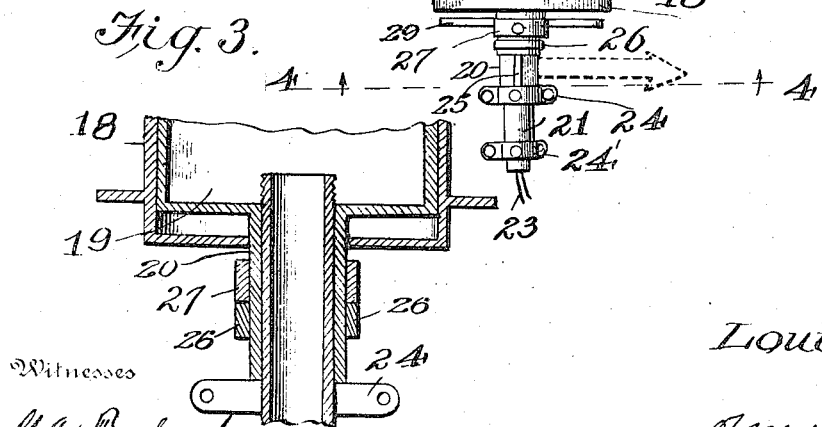
Figure 8:
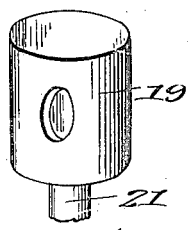

In the drawings forming a part of this application and in which like designating characters refer to corresponding parts throughout the several views, Figure 1 is a plan view of an automobile showing the present invention installed thereon. Fig. 2 is a front elevation of the invention detached. Fig. 3 is a vertical sectional detail view of the journal mounting means of the burner casing. Fig. 4 is a top plan view of the device. Fig. 5 is a bottom plan view on an enlarged scale of the central portion thereof. Fig. 6 is a bottom plan view of a modified form of rotating means for the burner. Fig. 7 is a lateral projection from Fig. 6, the bottom being at the left of the figure and the view being partly in elevation and partly in section with the members 42 omitted, and Fig. 8 is a perspective view of a rotary shield used herewith.

Referring more in detail to the drawings, the automobile 10 is illustrated as provided with the signal headlight 11 of my improved construction, the light from the lamp 12 of which is normally projected forwardly through the front lens 13 of the central cylindrical casing 14, and by means of the rear reflector 15.

Oppositely-extending side casings 16 are mounted upon the casing 14 and are provided with transparent glass fronts 17 representing outwardly pointing arrows, while said fronts may be formed of differently colored glass, such as red and green if desired.

The central casing 14 is provided with a cylindrical sleeve 18 the lower end of which depends from the bottom of the casing and having mounted therein for rotation a lamp casing 19, which casing is provided with a downwardly-extending sleeve 20 journaled upon the stationary hollow post 21 adapted to conduct the electric wires 23 therethrough to the burner 12, it being evident however, that gas tubes may be employed instead of wiring if desired.

The sleeve 20 is seated for rotation upon a strap 24 by means of which the post 21 is secured to the automobile 10 and is provided with a normally forwardly-extending direction indicating arrow 25 fixed thereto while above the latter a collar 26 is pinned to said sleeve for supporting a spider member 27. There is also provided a lower supporting strap 24'.

The front portion of the burner casing 19 having an opening 28 for projecting the light therethrough, it will be seen that such light will be projected by the reflector 15 forwardly through the front lens 13 when in normal running position, such burner casing 19 being adapted for rotation by means of the spider 27 as hereinafter described. The opening 28 is adapted to register with a hollow interior of either side casing 16 and thereby illuminate either of the arrow-shaped signal glass fronts 17 as may be desired.

The spider 27 is provided with opposite arms 29 to which are attached hand cords 30 extending to a point upon the dash-board 31 of the automobile; the chauffeur or operator of the vehicle by pulling either one of the cords 30 may readily shift the burner casing so as to change the direction of the light from its normal forward projection to whichever side he intends to turn the vehicle and thereupon the illumination of the direction arrow 17 upon that side of the vehicle and the position of the arrow 25 visually advises the public of the intended route of travel for the purposes of a warning and for the public safety.

A rearwardly-extending arm 32 of the spider is resiliently attached by means of the spring 33 to any stationary member such as the post 34, whereby the burner casing is normally positioned for forwardly projecting the rays of light.

In connection with the mounting of the device upon a vehicle, it is advisable to attach the same thereto by means of the rear brackets 35, one of which is carried by the central casing and by each of the end casings respectively.

In the modified construction shown in Figs. 6 and 7, it is designed to provide the casing 36 journaled upon the tube 37 supported in the ring 37', the latter having peripheral notches 38 for receiving the spring-pressed pin 39 when brought into alinement therewith by means of the handle 40 by which the casing may be revolved if desired, it being understood that when the casing is positioned accurately for forwardly projecting its rays, the central one of said notches will be engaged by the spring-pressed pin and when positioned in either of the side notches 38, light will be projected into the opposite one of the side casings 16. The arms 41 in this construction are manipulated by means of the cords 42 for rotating the casing 36 in substantially the same manner as set forth in the preferred construction.

While the forms of the invention herein shown and described are what are believed to be preferable embodiments thereof, it is nevertheless to be understood that various forms and modifications thereof may be had without departing from the spirit and scope of the invention as claimed.

Having thus fully described the invention and the manner in which the same is designed to operate, what I claim as new is:—

1. A signal comprising a hollow central casing, a front lens in said casing, oppositely-extending side casings secured to said central casing, arrow-shaped transparent plates pointing in opposite directions and positioned in the front walls of said side casings, a lamp casing having an open front portion revolubly mounted in said central casing, a downwardly projecting sleeve upon said lamp casing, a spider fixed to said sleeve, pull cords attached to the opposite arms of said spider, and a normally positioning spring carried by said spider.

2. A vehicle headlight comprising a casing, a central circular lens and oppositely pointing arrow-shaped plates in the front wall thereof, a fixed burner within said casing, a tubular burner casing having a front perforation therein and revolubly journaled vertically and substantially centrally of said casing with its perforation in normal alinement with said lens, a spider secured to said burner casing, means positioned adjacent the seat of the vehicle and attached to said spider and adapted for shifting said burner casing with its perforation to sidewardly position as herein described.

In testimony whereof I affix my signature in presence of two witnesses.

LOUIS IRSZA

Witnesses:
 CHARLES WEINER,
 NICK FLINTA.